United States Patent

[11] 3,596,547

[72] Inventor John D. Alexander
 Hawthorne, N.J.
[21] Appl. No. 869,257
[22] Filed Oct. 24, 1969
[45] Patented Aug. 3, 1971
[73] Assignee Lever Manufacturing Corporation
 Paterson, N.J.

[54] CUTTING TOOL
 27 Claims, 7 Drawing Figs.

[52] U.S. Cl. .................................................. 82/53
[51] Int. Cl. .................................................. B23b 5/14
[50] Field of Search .......................................... 82/53, 46,
 47, 46.1

[56] References Cited
 UNITED STATES PATENTS
 385,201 6/1888 Remus ........................ 82/46 X
 2,015,877 10/1935 Thompson ................... 82/46 X
 3,148,570 9/1964 Bogert ........................ 82/53

Primary Examiner—Leonidas Vlachos
Attorney—March, Le Fever and Wyatt

ABSTRACT: An improved rotary cutting tool for use in cutting or slicing rolls of a material is a combination gouge device for removing waste material formed by a double edged cutting blade and a cutting device for slicing or cutting a core element upon which said material is rolled. Positioning means are provided to insure that the gouging device does not contact the core element during the final slicing operation. In one embodiment of the invention the basic blade has a beveled cutting edge and contains at least one gouging tooth inset into the blade periphery which is extended into its operational position by centrifugal force when the tool is rotated. A limit switch operating in connection with a vane element and a braking means affixed to the driving mechanism for the blade may also be used to stop the rotation of the tool in the desired position for severing the central core element of the roll.

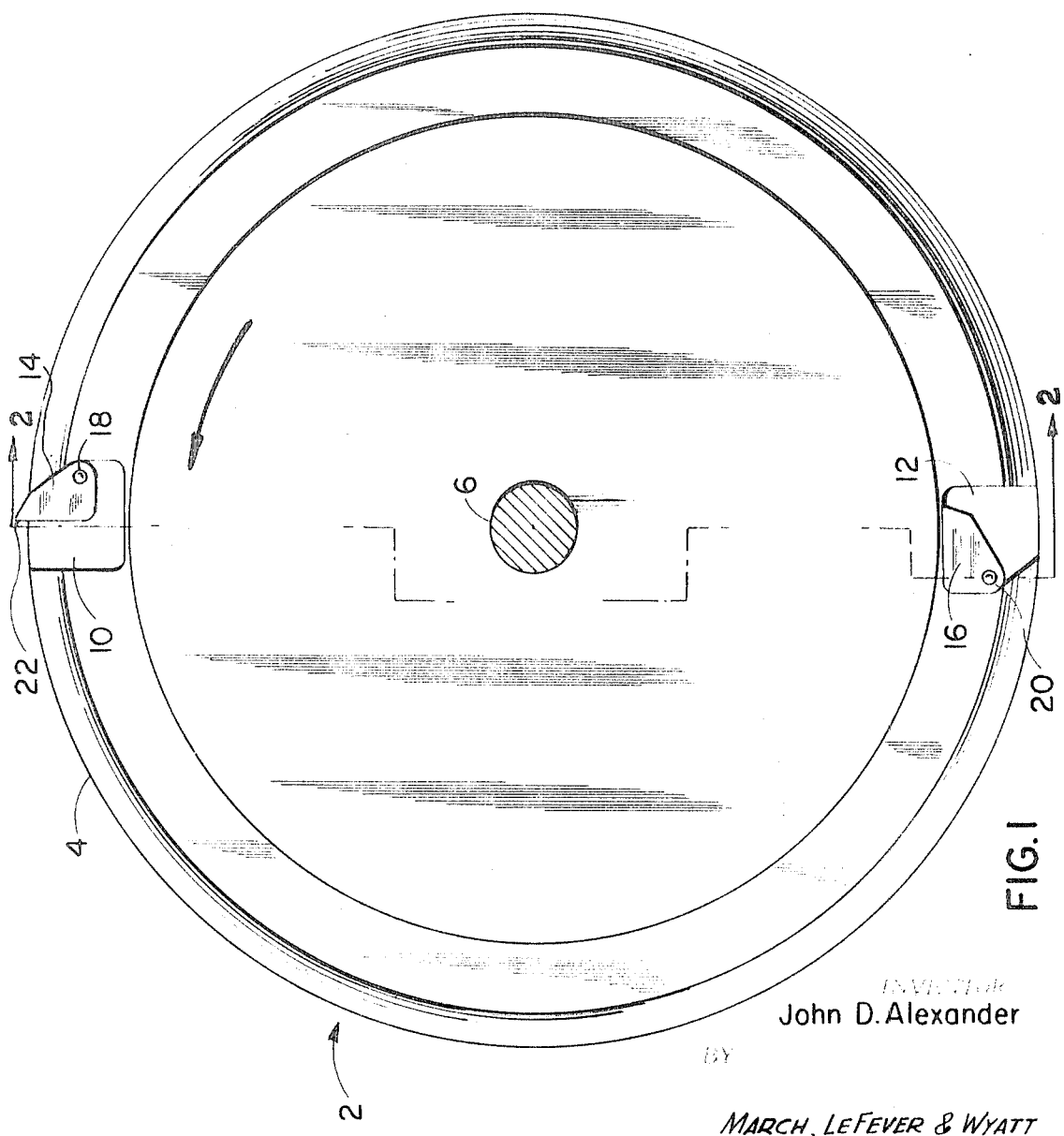

PATENTED AUG 3 1971

John D. Alexander

MARCH, LeFEVER, WYATT
ATTORNEYS

PATENTED AUG 3 1971

INVENTOR
John D. Alexander by

MARCH, LE FEVER & WYATT
ATTORNEYS

CUTTING TOOL

GENERAL DESCRIPTION OF INVENTION

The general art to which this invention relates is that of severing or, as the term is used in the art, slicing rolls of a film or other sheet material into two or more segments. It is normally the practice in the manufacture of film such as polyethylene film, polypropylene film, "saran" film, acrylic film, various other sheet materials and the like to prepare the material in continuous sheets, usually from an extruder laminator, coater, and the like and wind the continuous sheet upon a core of paper, cardboard, etc., in order to enable it to be handled in shipping. As is normal in such circumstances the roll of material quite often needs to be divided into rolls of lesser width before utilization in a commercial operation.

The art of severing these "bulk" rolls of material, due to the great amount of present commercial usage, has developed extensively in the past few years. For example, machinery and apparatus for performing this operation are described and claimed in U.S. Pat. Nos. 3,083,601 and 3,312,130.

In general the prior art machines are directed to an operation wherein a knife is controllably brought into contact with a roll of rotating material, the knife slicing through the roll and making the desired cut.

One new development which has particular advantages in the severing of bulk rolls of material involves the use of two spaced cutting edges, such as twin edged cutting blades or a double-edged cutting blade which is U-shaped in cross section. Such cutting means is normally adapted to be rotated against the bulk roll such that the cutting edges progress through the spinning roll of bulk material. It becomes necessary, therefore, for the waste material, that is to say that material between the two incisions, to be removed concurrently with the severing of the roll. The prior art devices for accomplishing this purpose have normally been a second whirling blade operating in a position radially opposed from the cutting blades. This waste removal blade is usually provided with teeth that have cutting edges that are parallel to the plane of the bulk roll and thus "dig out" or "gouge" the waste material as it is formed by the cutting blades.

This prior apparatus has the disadvantage that at the end of the "slicing" operation another provision must be made for severing the core of cardboard or other supporting material which forms the center of the bulk roll and consequently of the individual "slices" thereof. It is to this total operation that the novel cutting and gouging tool of the instant invention is directed. The apparatus provided hereby effectively removes the waste material between the incisions made by the twin cutting blades and, in addition, it is designed to finish the total operation by providing a single cutting edge for severing the core material at the center of the roll.

This invention relates to a rotary cutting tool. Particularly the invention relates to a novel cutting and gouging device which is adapted to be operated in conjunction with twin edged cutting means such as a double edge U-shaped slicing tool for slicing or severing rolls of a material into shorter sections. More particularly the invention relates to a novel cutting and gouging tool which is adapted to be positioned in the final stages of the slitting operation to sever the core element of the roll cleanly and evenly at the desired position. Still more particularly the invention relates to a novel cutting and gouging tool which is adapted with means to position at least one gouging tooth into operative position upon rotation of the device and is equipped with positioning means whereby the gouging tooth is placed in an inoperative position for severing the core element of the roll of material.

Broadly the invention relates to an apparatus designed to sever bulk rolls of a material into two or more "slices" of lesser width. The apparatus includes means for suitably rotating the bulk roll of material at a controlled rate with the usual supporting structure, etc. Adjustably positioned on the supporting carriage is a rotatable cutting or slicing means having twin edges, such as a U-shaped cutting blade and means for its rotation so that two adjacent incisions are made in the film roll when the two are in contact. Positioned at some peripherally opposed location to the twin edged cutting blades and adapted with means to impart rotation thereto, is a combination gouging and slicing tool which is adapted to remove the "waste" material, that is, the material between the two adjacent incision. This gouging action is brought about by one or more gouging teeth which are in operative position when the tool is in rotation and thus gouges or scrapes the strip of waste material from the roll as the depth of cut made by the twin cutting edges or U-shaped edge proceeds. However, when the material is completely severed and the concomitant waste is removed, the combination gouging and cutting tool becomes a single edged cutting tool and the core material in the center of the bulk roll is sliced with a single incision in the "kerf" formed by the double edged cutting blade, thus leaving a slight extension of the central core beyond the severed edge of the material as a protective measure.

Specifically the instant invention relates to a novel and unique cutting and gouging tool to perform the above described waste removal function and, in addition, to provide a severing mechanism for severing in the desired position, the core element upon which the material is rolled at the time of manufacture.

In one embodiment, the novel device of this invention is a single edged beveled rotary cutting tool which is provided with at least one gouging tooth and with positioning means for insuring that the gouging tooth does not contact the inner core element in the final stage of the slicing operation when the core element is being cut.

In embodiments to be hereinafter more specifically described, the novel of this invention utilizes the centrifugal force resulting from rotation of the tool to move gouging teeth mounted on the outer periphery of a blade element into operative position, that is to say, in a position in which the cutting edge of the gouging tooth extends radially outwardly and beyond the outer periphery of the blade edge. In the absence of the centrifugal force the gouging tooth or teeth are retracted into recesses and in the retracted, or closed, position the cutting edge of the gouging tooth or teeth are in a position inwardly from the outer cutting edge of the blade. In the latter, nonoperative or closed position, only the single beveled edge of the tool of this invention contacts the core element to make a clean incision and to sever the core element in a smooth and efficient manner.

In another embodiment of the invention the positioning means, that is the means for insuring that only the single beveled cutting edge of the tool contacts the core element in the final stages of the severing operation, include a limit switch through which the device operates which coacts with one or more vanes affixed to the driving mechanism and a braking mechanism for the blade to cause the blade to come to rest at a desired position.

Operating in the track of the double edged U-shaped main cutting blade and in the center thereof the improved cutting tool of this invention results in a finished roll of material wherein the core element extends slightly outwardly from the ends of the material of the roll, thus affording some degree of protection to the severed ends of the material.

In one embodiment the improved cutting and gouging tool of this invention may operate in a rotary direction opposite that of the double edged main slicing blade and is normally positioned diametrically opposite the roll of material from the double edged cutting blade. The position of the improved tool, however, may be selected around the periphery of the roll of material at any position which is best suited for the particular operation.

It is to be seen from the above general description that the inventive concept contemplates a twin incision in a roll of material with means for removing the waste material from between the two incision with provisions for severing the core element at the center of the roll of material. The twin incisions or cuts may be made, preferably, with a U-shaped rotatable cutting blade or with a pair of spaced rotary cutting blades. A pair of twin band knife blades may also be used. In some applications a pair of heated wires will perform the desired function of severing a roll of material into two or more portions, particularly film material such as a polyolefin or the like.

The slicing and gouging means is preferably a rotatable cutting blade with one or more gouging teeth which serves as a means for removing waste material from the kerf or from between the twin incisions and for slicing the core element of the roll of material. Other forms of this cutting and gouging tool are contemplated, however. For example, the tool may be simply an elongated member such as an arm having a "tooth" at the end thereof, the thickness of the member being of a dimension slightly less than the width of the kerf or the distance between the twin cutting edges, with one edge of such arm member being a knife edge such that when it is brought into contact with a rotating core element it will sever it. A double armed member with a gouging tooth on both ends and with a mounting hole in the center and with at least one arm edge being a cutting edge may also be adapted for use.

It is also within the concept of this invention to fabricate the gouging and cutting tool in the form of an endless blade, such as a band saw blade, it being equipped in this instance with at least one gouging tooth, preferably a plurality of gouging teeth, having cutting or gouging surfaces substantially perpendicular to the direction of travel of the endless blade and operating by means of a driving wheel and an idler wheel, again preferably, but not necessarily in a direction contra to the rotation of the roll of material being cut and between the two cuts. Such an endless blade would have at least one area which comprises a single-edged slicing means and may be positioned by positioning means such that the slicing edge only contacts the core element when the material rolled thereon has been completely severed and the kerf removed.

It is also contemplated that instead of gouging teeth the means for removing the waste material from the kerf may be pointed projections, such as needles which upon rotational contact with the waste, penetrate and remove it from the kerf.

Other means for positioning the gouging, or waste removing means, will of course become apparent to those skilled in the art. For example, mechanical means for extending the gouging element may be designed such as a cam and follower arrangement, the cam being fitted to the tool shaft and arranged so that when it is adjusted the follower mechanism extends the gouging mechanism into operative position.

DETAILED DESCRIPTION OF INVENTION

The novel cutting tool of this invention will be more specifically described by reference to the following drawings in which FIG. 1 represents a side plan view of one embodiment of the device of this invention;

FIG. 2 is a cross-sectional view of the embodiment illustrated in FIG. 1 taken along the line 2-2 of FIG. 1;

Figure 3:
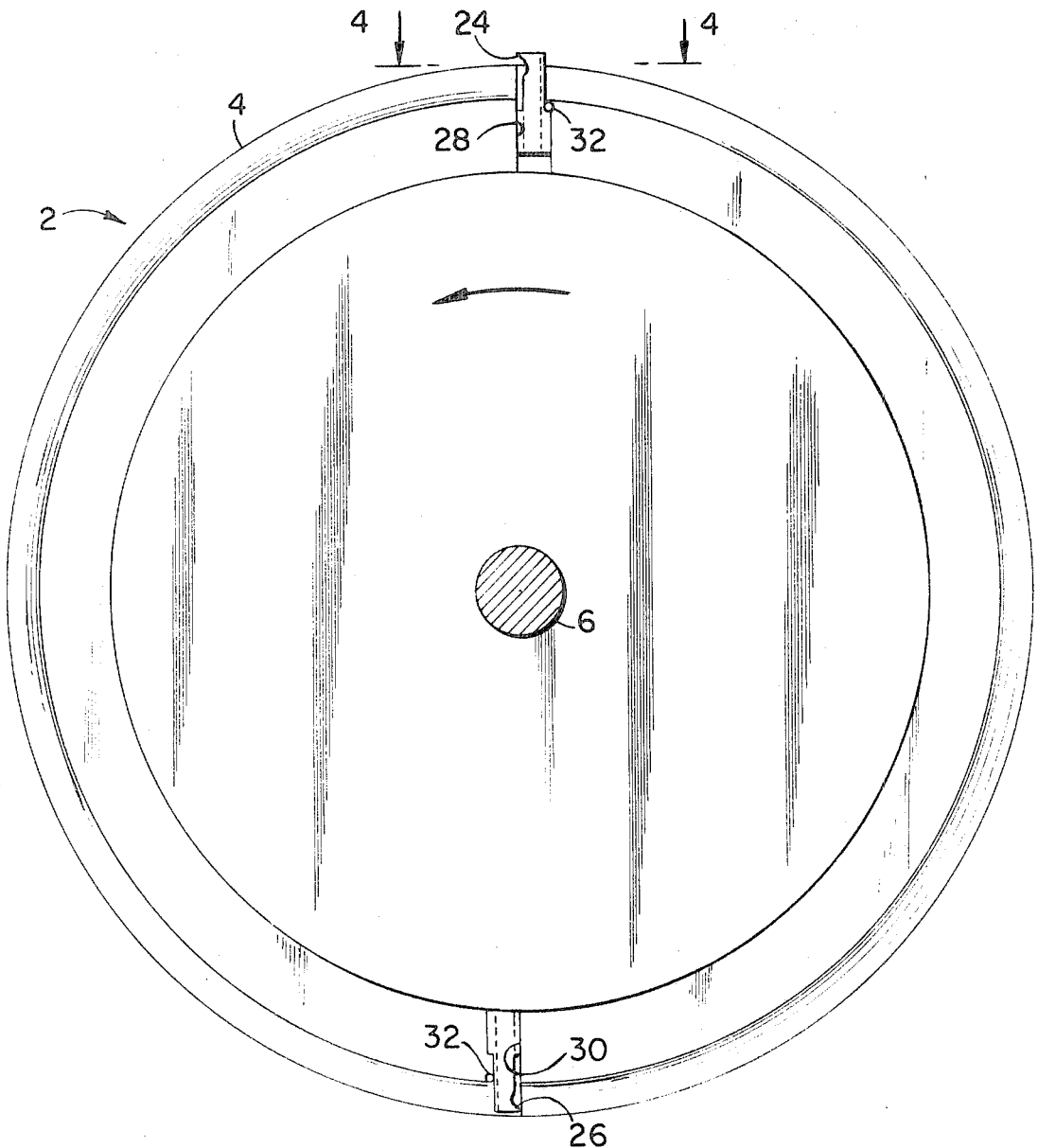
FIG. 3 is a side plan view of a second embodiment of the device of the invention.

Turning now to the drawings, with particular reference to FIGS. 1 and 2, numeral 2 indicates a rotary cutting tool in accordance with one embodiment of the invention having a beveled cutting edge 4 and an aperture, 6, for fitting on the desired arbor. Positioned in the outer periphery of the cutting blade 2 and diametrically opposed to each other are two recesses 10 and 12 which extend downwardly from the cutting edge 4 of blade 2. Positioned in recesses 10 and 12 are gouging teeth 14 and 16 which are affixed to blade 2 by means of pivots 18 and 20. For purposes of illustration, gouging tooth 14 is shown in its open or operating position and gouging tooth 16 is shown in its closed or nonoperative position. With particular reference to gouging tooth 14 it is seen that cutting edge 22, when the gouging tooth is in the operating position, extends radially outwardly from the extreme of the cutting edge 4 and thus is adapted to cut and remove waste material formed by a double edged U-shaped cutting blade when properly positioned with relation thereto. When the device illustrated in FIGS. 1 and 2 is rotated in a counterclockwise direction, centrifugal force causes the gouging teeth 14 and 16 to rotate about their respective pivot points into their operative positions as shown in the top portion of the drawing. When the rotation ceases or slows to a rotational speed such that the centrifugal force is not sufficient to hold the teeth in their open or operative position, the gouging teeth 14 and 16 pivot about their respective pivot points into recesses 10 and 12 and assume their closed or nonoperative position. It is to be seen, then, that only cutting edge 4 of blade 2 will come in contact with the core element upon which the roll of material is wrapped.

Figure 4:
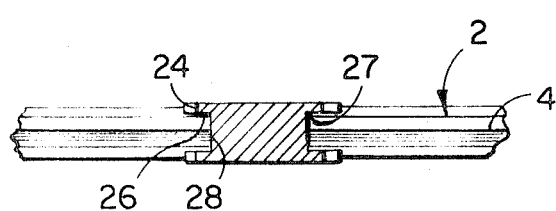
FIG. 4 is a top plan (top cross sectional view) of the embodiment of FIG. 3 taken along the line 4-4 of FIG. 3.

In FIGS. 3 and 4 there is shown a second embodiment of an improved cutting and gouging tool in accordance with the inventive concept. In this embodiment gouging teeth 24 and 26 are shown in their respective operative and closed position in recesses 28 and 30.

In this embodiment and with particular reference to FIG. 4 the gouging teeth are fabricated with an opposed pair of U-shaped channels, shown at 26 and 28, which are of slightly greater width than the width of rotary blade 2. A limiting device such as a pin 32 or other stopping device is provided on the gouging teeth to limit their outward movement which again is caused by the application of centrifugal force upon rotation of blade 2.

In this embodiment of the invention, as cutting tool 2 revolves in a counterclockwise direction, the gouging teeth are forced by the developed centrifugal force into their open or operative position, which is illustrated at the top of FIG. 3 by gouging tooth 24. When rotation ceases or slows to a calculated centrifugal force resultant therefrom, the gouging teeth recede into the respective apertures so that cutting edge 4 becomes the outer periphery of the device.

Figure 5:
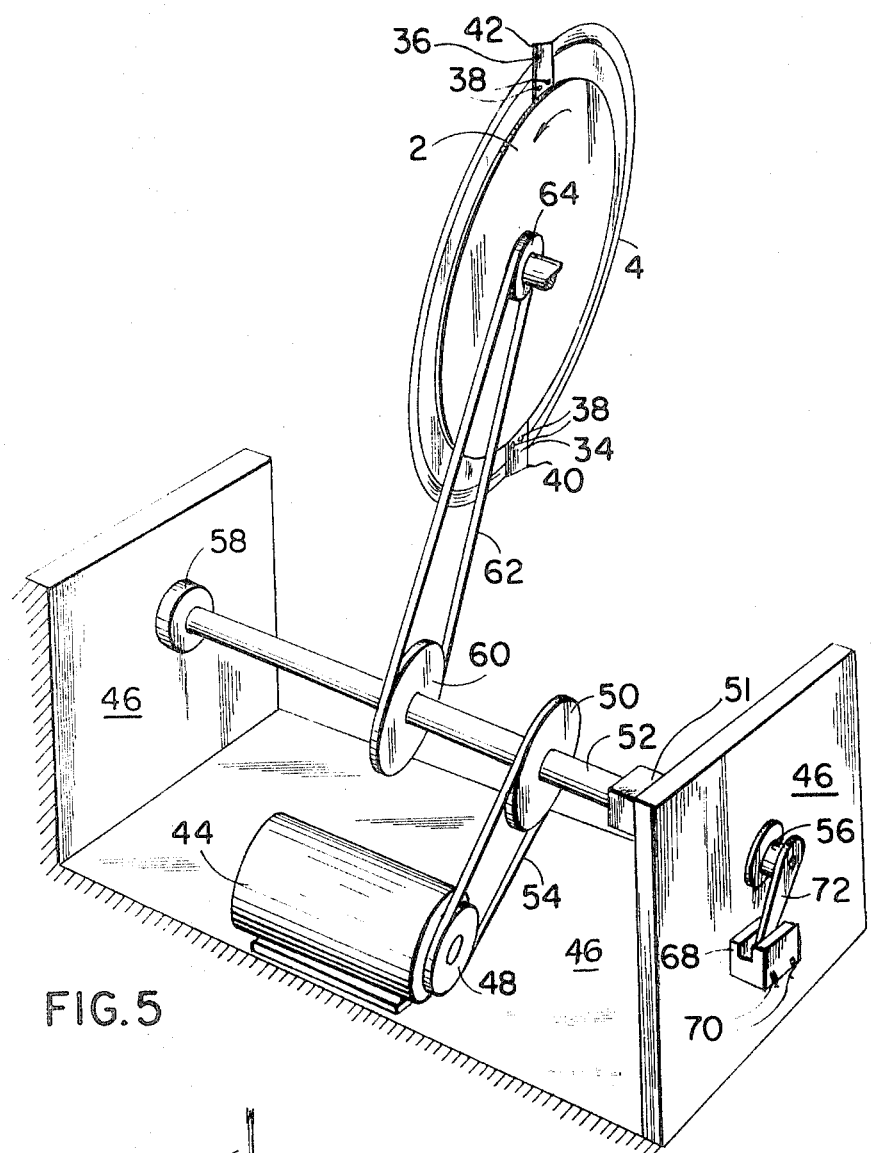
FIG. 5 is a view, partially in perspective, of an embodiment of the invention showing one means for positioning the gouging and cutting tool for core slicing.
Figure 6:
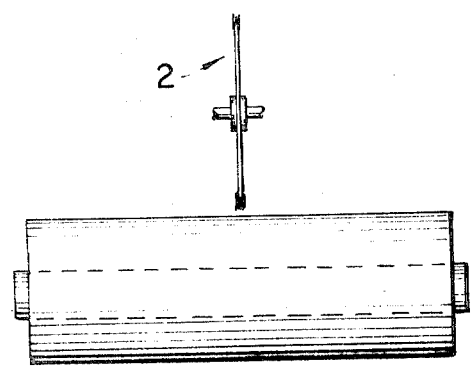
FIG. 6 is a diagrammatic sketch of an apparatus showing the improved device of the invention in position for operation relative to the double edge U-shaped main cutting blade and a roll of material to be severed.
Figure 7:
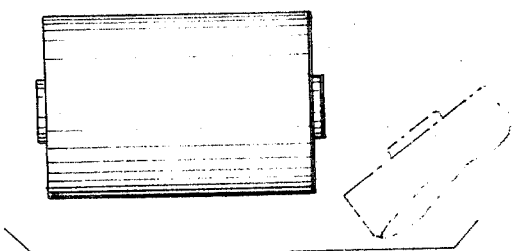
FIG. 7 is an enlarged view showing a section or slice of a roll of material which has been severed using the novel inventive device.

Turning now to FIG. 5, a third embodiment of the invention is illustrated. In this embodiment of the invention gouging teeth 34 and 36 are permanently affixed to the outer periphery of blade 2, and again diametrically opposed to each other for purposes of balance, by means of pins 38. Pins 38 may be screws, rivets or any other desired means for affixing the gouging teeth rigidly in their operative positions as shown; that is to say so that the cutting surfaces 40 and 42 of the gouging teeth extend radially outwardly from the cutting edge 4 of the blade. Preferably pins 38 are removable screws so that teeth 34 and 36 may be removed for easier sharpening of both the teeth and the cutting edge.

In this embodiment of the invention positioning means are provided to insure that the cutting surfaces 40 and 42 of gouging teeth 34 and 36 do not contact the core element of the roll of material when the slicing operation is completed and it is desired to sever the core element.

In this embodiment positioning means for insuring that only the cutting edge of blade 2 contacts the core element comprises an electrically operated magnetic brake element coacting with a limit switch and a vane element disposed at some selected location in the power train of blade 2. Operation of this electrical positioning means will insure that rotation of blade 2 will be stopped in a position such that gouging teeth 34 and 36 do not contact the rotating core element resulting in a neat single slicing incision by the cutting edge of blade 2.

In the embodiment shown in FIG. 5 the power train for rotation of blade 2 comprises motor 44 mounted at a convenient location on carriage 46 whose driving wheel 48 drives driven wheel 50 on journaled shaft 52 by means of belt 54. Driven wheel 50 is affixed to journaled shaft 52 and when driven causes the rotation of journaled shaft 52 in bearings 56 and 58, which similarly causes driving wheel 60 to rotate, this wheel being locked to journaled shaft 52 in the same manner as is driven wheel 50 as by locking keys, screws, or other means known to the art. Rotation of driving wheel or pulley 60 causes blade 2 to rotate, power being transmitted through belt or chain 62 to pulley 64, affixed to blade 2.

Attached to carriage or frame member 46 is an electrically operated limit switch 68 which is electrically connected to magnetic brake 51, and the power source. Fixedly attached to journaled shaft 52 is a vane element 72 which coacts with limit switch 68. The arrangement is such that when vane 72 is positioned between the elements of limit switch 68 current is applied to magnetic brake 51, shutting off power to motor 44 and locking shaft 52 from further rotation. The position of vane element 72 is selected such that when shaft 52 is locked, gouging teeth 34 and 36 are in a position such that they do not contact the core element of the roll.

Thus when the material has been completely severed and the support means for cutting and gouging blade 2 reaches a desired lowered position, power to motor 44 is interrupted by switching means and power is supplied to braking means 51 through limit switch 68 when vane element 72 is between its elements. Braking action is thus supplied to journaled shaft 52 and it is slowed and finally locked in a position such that only the slicing edge of blade 2 contacts the core element.

Other arrangements of this electrically operated positioning means may, of course, be designed without departing from the inventive concept.

It is to be understood, of course, that the positioning means for blade 2 as contemplated in this embodiment may be adapted to the apparatus in any number of positions depending upon various factors such as convenience, accessibility and the like. The one shown in FIG. 5 is to be considered as illustrative only.

It is to be seen, therefore, that there is provided herewith a means and apparatus for completing in one operation a procedure which has been hitherto accomplished by a much more complicated series of operations. The present apparatus relates to a device for severing bulk rolls of material by the coaction of a U-shaped cutting blade and a novel gouging tool which performs a double function; that of removing the waste material formed by the cutting blade and slicing the central core of the roll in the desired manner.

It will be appreciated, of course, that various mechanical arrangements can be designed for the apparatus of the invention and those familiar with the art will at once appreciate that other embodiments of the inventive concept may be designed without, however, departing from the concept of the invention.

To summarize briefly, the instant invention relates to an improved rotary cutting and gouging tool which has a single beveled cutting edge and which is equipped with at least one gouging tooth for removing waste material from a roll of material which is being sliced or severed by twin edged cutting means such as a double edged U-shaped cutting blade.

The improved device of this invention is equipped with means for insuring that only the single beveled cutting edge of the device contacts the central core element of the roll of material, thus insuring a smooth, even cut of the core. These insuring means include the application of centrifugal force to place the cutting edges of the gouging teeth in operating position upon rotation of the device and electrical means in the nature of a limit switch operated braking mechanism for insuring that the device is stopped in a position such that only the single beveled cutting edge will contact the central core element.

What I claim is:

1. An apparatus for severing bulk rolls of a material rolled upon a central core element which comprises:

means for rotation of said bulk roll of material;
adjustable twin edged slicing means for severing the material on said bulk roll in two adjacent incision;
means for rotating said twin edged slicing means;
cutting means for severing the core fitted with at least one gouging tooth for removing material from between said two adjacent incisions;
means for rotating said cutting means; and
positioning means for insuring that said gouging tooth does not contact said core element.

2. An apparatus according to claim 1 wherein said gouging tooth is pivotally attached to said cutting means.

3. An apparatus according to claim 1 wherein said gouging tooth is movably attached to said cutting means in grooved recesses therein.

4. An apparatus according to claim 1 wherein said cutting means is fitted with two diametrically opposed gouging teeth.

5. An apparatus according to claim 1 wherein said cutting means comprises a circular single edged rotary cutting blade adapted with a pair of diametrically opposed gouging teeth which are held in operative position extending radially outwardly from the cutting edge of said rotary cutting blade by centrifugal force when said cutting blade is in rotary motion and which extends radially in from the cutting edge of said rotary cutting blade when said cutting blade is at rest.

6. An apparatus according to claim 5 wherein said gouging teeth are pivotally attached on said rotary cutting blade and pivot about said pivot attachment into operative position when said cutting blade is in rotary motion and pivot about said pivot attachment into a nonoperative position in a recess in the outer periphery of said rotary cutting blade when said blade is at rest.

7. An apparatus according to claim 5 wherein said gouging teeth are slidably attached to the outer periphery of said rotary cutting blade and slide radially outwardly into operative position when said blade is rotated and slide radially inwardly into a nonoperative position in a recess in the outer periphery of said blade when said blade is at rest.

8. An apparatus according to claim 1 wherein said cutting means comprises a single edged cutting blade having affixed thereto at least one gouging tooth on the outer periphery thereof and positioning means to prevent said gouging tooth from contacting a core structure upon which the material is rolled.

9. An apparatus according to claim 8 wherein said positioning means comprises pivoting means whereby said gouging tooth is pivotally mounted in a recess in the outer periphery of said cutting blade, centrifugal force imparted to said tooth by rotary motion of said blade causing said tooth to pivot into an operative position outwardly from said blade edge.

10. An apparatus according to claim 8 wherein said positioning means comprises slidable mounting means whereby said gouging tooth is radially slidably mounted in a recess in the outer periphery of said cutting blade, centrifugal force imparted to said tooth by rotary motion of said cutting blade causing said tooth to extend radially outwardly into an operative position outwardly from said blade edge.

11. An apparatus according to claim 8 wherein said positioning means comprises a braking device operative during the diminishing rotation rate of the cutting blade.

12. An apparatus according to claim 8 wherein said rotary cutting blade comprises a single edged rotary cutting blade having a pair of diametrically opposed gouging teeth affixed to the outer periphery thereof and extending outwardly from the cutting edge thereof; a limit switch operated braking device attached to the power train of said blade to stop rotary motion of said rotary blade in a position such that gouging teeth are not in contact with the core structure upon which said roll of material is rolled.

13. An improved cutting and gouging device adapted to be used in conjunction with a U-shaped cutting blade for cutting rolls of material which comprises a circular rotatable cutting blade fitted with at least one movable gouging tooth, said tooth moving into operating position by centrifugal force generated by rotation of said blade.

14. A blade according to claim 13 wherein said gouging tooth is pivotally attached to said cutting blade.

15. A device according to claim 13 wherein said gouging tooth is movably attached to said cutting blade in grooved recesses therein.

16. A device according to claim 13 wherein said cutting blade is fitted with two diametrically opposed gouging teeth.

17. A cutting and gouging device adapted to be used for cutting rolls of a material in conjunction with a U-shaped rotary cutting blade which comprises a circular single edged rotary cutting blade adapted with a pair of diametrically opposed gouging teeth which are held in an operative position extending radially outwardly from the cutting edge of said rotary cutting blade by centrifugal force when said cutting blade is in rotary motion and which extends radially inwardly from the cutting edge of said rotary cutting blade when said cutting blade is at rest.

18. A device according to claim 17 wherein said gouging teeth are pivotally attached on said rotary cutting blade and pivot about said pivot attachment into operative position when said cutting blade is in rotary motion and pivot about said pivot attachment into a nonoperative position in a recess in the outer periphery of said rotary cutting blade when said blade is at rest.

19. A device according to claim 17 wherein said gouging teeth are slidably attached to the outer periphery of said rotary cutting blade and slide radially outwardly into operative position when said blade is rotated and slide radially inwardly into a nonoperative position in a recess in the outer periphery of said blade when said blade is at rest.

20. A gouging and cutting device adapted to remove waste material and to sever the core element of a roll of material when used in conjunction with a U-shaped rotary cutting blade which comprises a single edged cutting blade having affixed thereto at least one gouging tooth on the outer periphery thereof and positioning means to prevent said gouging tooth from contacting a core structure upon which the material is rolled.

21. A device according to claim 20 wherein said positioning means comprises pivoting means whereby said gouging tooth is pivotally mounted in a recess in the outer periphery of said cutting blade, centrifugal force imparted to said tooth by rotary motion of said blade causing said tooth to pivot into an operative position outwardly from said blade edge.

22. A device according to claim 20 wherein said positioning means comprises slidable mounting means whereby said gouging tooth is radially slidably mounted in a recess in the outer periphery of said cutting blade, centrifugal force imparted to said tooth by rotary motion of said cutting blade causing said tooth to extend radially outwardly into an operative position outwardly from said blade edge.

23. A device according to claim 20 wherein said positioning means comprises a braking device operative during the diminishing rotation rate of the cutting blade.

24. An improved gouging and slicing wheel adapted to remove waste material and to sever the core element of a roll of material when used in conjunction with a U-shaped double edged rotary cutting blade which comprises a single edged rotary cutting blade having a pair of diametrically opposed gouging teeth affixed to the outer periphery thereof and extending outwardly from the cutting edge thereof; an electrically operated braking device disposed in the power train of said blade to stop rotary motion of said rotary blade in a position such that gouging teeth do not contact the core structure upon which said roll of material is rolled.

25. An apparatus for severing rolls of a material rolled upon a central core element which comprises:
  means for rotation of said bulk roll of material;
  adjustable twin edged slicing means for severing the material on said bulk roll in two adjacent incisions;
  means for propelling said twin edged slicing means;
  an endless blade cutting means for severing the core fitted with at least one gouging tooth for removing material from between said adjacent incisions;
  means for insuring that said gouging tooth does not contact said core element.

26. An apparatus according to claim 25 wherein said endless blade cutting means is equipped with a plurality of gouging teeth having cutting edges perpendicular to their direction of travel and at least one area of a single slicing edge for severing said central core element.

27. An apparatus according to claim 25 wherein said means for propelling said endless blade cutting means comprises a driving wheel and an idler wheel.